UNITED STATES PATENT OFFICE.

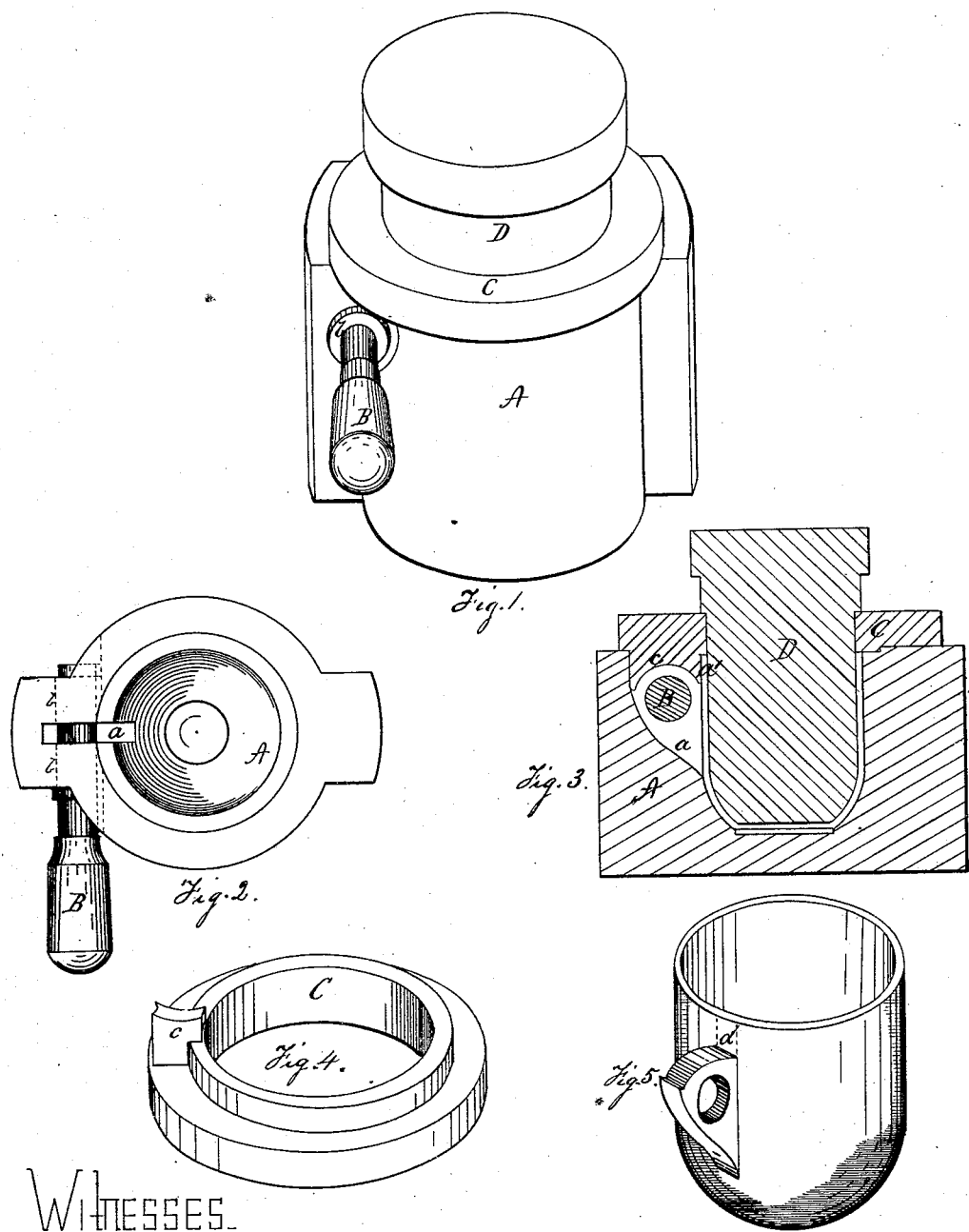

JOHN H. SMITH AND MATTHEW SMITH, OF PITTSBURG, PENNSYLVANIA.

IMPROVEMENT IN MOLDS FOR GLASSWARE.

Specification forming part of Letters Patent No. 163,539, dated May 18, 1875; application filed April 24, 1875.

*To all whom it may concern:*

Be it known that we, JOHN H. SMITH and MATTHEW SMITH, of Pittsburg, in the county of Alleghany and State of Pennsylvania, have invented new and useful Improvements in the Manufacture of Glassware; and we do hereby declare the following to be a full, clear, and exact description thereof, reference being had to the accompanying drawing forming part of this specification, in which—

Figure 1 is a perspective view of a mold, which may be employed in carrying out our invention. Fig. 2 is a top view of the same, the plunger and ring being removed. Fig. 3 is a vertical section on the line $x\,x$, Fig. 1. Fig. 4 is a bottom view of the ring; and Fig. 5 is an article formed in said mold.

Like letters refer to like parts wherever they occur.

Our invention relates to the manner of forming handles and similar projections upon glassware, either for use or ornamentation; and it consists in pressing the glass around a removable pin or mandrel which crosses the mold or a portion thereof, said pin or mandrel being withdrawn to permit the removal of the article from the mold.

Heretofore mugs with handles, and similar articles, have been formed in two-part molds, provided with projections or stop-outs, or the handles have been applied after the article was withdrawn from the mold.

The object of the present invention is to form the handle at the time of pressing, and at the same time to employ a drop-mold, by which means mold marks are avoided.

We will now proceed to describe our invention, so that others skilled in the art to which it appertains may apply the same.

In the drawing, a cup and the mold for forming it have been selected to illustrate the invention, A being the mold, preferably a solid or jointless mold, sometimes termed a "drop-mold," corresponding in size and form to the article to be produced, having recessed portions, as at $a$, for forming a handle or ornamental projection. The recess $a$ or other proper portion of the mold is crossed by a removable mandrel or pin, B, which passes through openings $b$ in the mold. C is a ring, usually employed with molds, said ring being provided with a projection, $c$, which fits into the recess restricting and determining the form thereof. D is a plunger, which will, of course, correspond to the form of the mold. Instead of a single mandrel or pin passing entirely through the mold, two mandrels, introduced from opposite sides and meeting, may be employed, in which case the mold-mark would scarcely be observed, as it would be within the ring of the handle.

Wherever perforated projections are to be formed on glassware, and it is desirable to avoid mold-marks, the principle involved in this invention may be readily applied by the skilled mechanic.

In forming an article, the mandrel is passed through the openings in the mold, the ring is placed in position, the glass cut into the mold, and the plunger brought down, forcing the glass into all the cavities of the mold, after which the pin or mandrel is withdrawn, the ring removed, and if a drop-mold has been used, the mold reversed to discharge the article.

As the mold A is jointless, except for a small distance at $a'$, where it is completed by the projection $c$ of the ring, it is evident the article, when it comes from the mold, will be devoid of mold-marks, except at the joint $d$, and this will be so slight as to "warm" out in annealing the article, leaving an article virtually without mold-marks.

Having thus described our invention, and the manner of applying it, what we claim, and desire to secure by Letters Patent, is—

1. The process herein described form forming handles and ornamental projections upon glassware, by forcing the glass around a removable mandrel, which crosses the mold or a portion thereof.

2. The combination of mold A and mandrel B, substantially as and for the purpose specified.

3. The combination of mold A, mandrel B, and ring C, having the projection $c$, substantially as and for the purpose set forth.

In testimony whereof we, the said JOHN H. SMITH and MATTHEW SMITH, have hereunto set our hands.

JOHN H. SMITH.
MATTHEW SMITH.

Witnesses:
T. B. KERR,
F. W. RITTER, Jr.